(12) United States Patent
Han et al.

(10) Patent No.: US 6,898,320 B2
(45) Date of Patent: May 24, 2005

(54) METHOD FOR PROCESSING NODES IN 3D SCENE AND APPARATUS THEREOF

(75) Inventors: Mahn-jin Han, Kyungki-do (KR);
Sung-jin Kim, Kyungki-do (KR);
Euee-seon Jang, Kyungki-do (KR);
Do-kyoon Kim, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 585 days.

(21) Appl. No.: 09/805,562

(22) Filed: Mar. 14, 2001

(65) Prior Publication Data

US 2001/0028744 A1 Oct. 11, 2001

(30) Foreign Application Priority Data

Mar. 14, 2000 (KR) ........................................ 2000-12849
Jul. 10, 2000 (KR) ........................................ 2000-39266
Mar. 6, 2001 (KR) ........................................ 2001-11473

(51) Int. Cl.$^7$ ............................................... G06K 9/36
(52) U.S. Cl. ................................................... 382/232
(58) Field of Search ................................ 382/232, 241, 382/243; 345/418, 419, 420, 423, 424; 707/101

(56) References Cited

U.S. PATENT DOCUMENTS

| | | | | | |
|---|---|---|---|---|---|
| 5,999,189 | A | * | 12/1999 | Kajiya et al. ................ | 382/232 |
| 6,195,088 | B1 | * | 2/2001 | Signes ....................... | 715/500.1 |
| 6,535,215 | B1 | * | 3/2003 | DeWitt et al. ............... | 345/473 |
| 6,611,262 | B1 | * | 8/2003 | Suzuki ........................ | 345/419 |
| 6,668,091 | B1 | * | 12/2003 | Kim et al. ................... | 382/243 |

FOREIGN PATENT DOCUMENTS

EP    0 903 698 A2    3/1999

OTHER PUBLICATIONS

Chiariglione, L. *Report of the 47th MPEG Meeting International Organisation for Standardisation Organisation Internationale de Normalisation ISO/IEC JTC 1/SC 29/WG 11 Coding of Moving Pictures and Audio* N2647 pp. 1–88 (Mar. 1999).
Tasaka, Shuji et al. *"Single–Stream versus Multi–Stream for Live Media Synchronization,"* IEEE pp. 470–476 (1998).
Eleftheriadis, Alexandros "MPEG–4 Systems: Architecting Object–Based Audio–Visual Content," IEEE pp. 535–540 (Jun. 1998).
Koenen, R., "MPEG–4 Multimedia for our time," IEEE Spectrum, Feb. 1999, pp. 26–33, vol. 36, No. 2.

* cited by examiner

*Primary Examiner*—Jose L. Couso
(74) *Attorney, Agent, or Firm*—Burns, Doane, Swecker & Mathis, L.L.P.

(57) ABSTRACT

A method for processing nodes in 3-dimensional (3D) scene and an apparatus thereof are provided. The method includes the steps of identifying a 3D mesh node having 3D mesh information representing a 3D shape which is formed by constructing faces from vertices among nodes contained in a 3D scene to be processed; and encoding or decoding the identified 3D mesh node. Also, the method includes the step of transmitting or storing the 3D mesh information of the encoded 3D mesh node through an independent stream separate from the 3D scene description stream. According to the method, a node representing 3D mesh information having a huge volume of information in a 3D scene can be efficiently encoded and decoded so that the 3D scene can be efficiently transmitted and stored. By transmitting and storing 3D mesh information of a node representing encoded 3D mesh information, through an independent stream separate from 3D scene description information, the entire 3D scene cannot be affected even though encoded 3D mesh information has a huge volume.

46 Claims, 20 Drawing Sheets

FIG. 7A

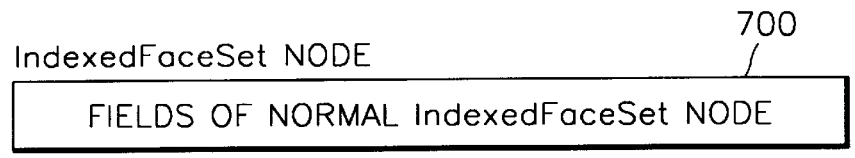

FIG. 7B

IndexedFaceSet{
| | | | |
|---|---|---|---|
| eventIn | MFInt32 | set_colorIndex | |
| eventIn | MFInt32 | set_coordIndex | |
| eventIn | MFInt32 | set_normalIndex | |
| eventIn | MFInt32 | set_texCoordIndex | |
| exposedField | SFNode | color | NULL |
| exposedField | SFNode | coord | NULL |
| exposedField | SFNode | normal | NULL |
| exposedField | SFNode | texCoord | NULL |
| field | SFBool | ccw | TRUE |
| field | MFInt32 | colorIndex | [] |
| field | SFBool | colorPerVertex | TRUE |
| field | SFBool | convex | TRUE |
| field | MFInt32 | coordIndex | [] |
| field | SFFloat | creaseAngle | 0.0 |
| field | MFInt32 | normalIndex | [] |
| field | SFBool | normalPerVertex | TRUE |
| field | SFBool | solid | TRUE |
| field | MFInt32 | texCoordIndex | [] |

}

IndexedFaceSet NODE

```
IndexedFaceSet{
    eventIn      MFString    url              []
    eventOut     SFBool      doneLoading
}
```

FIG. 9A

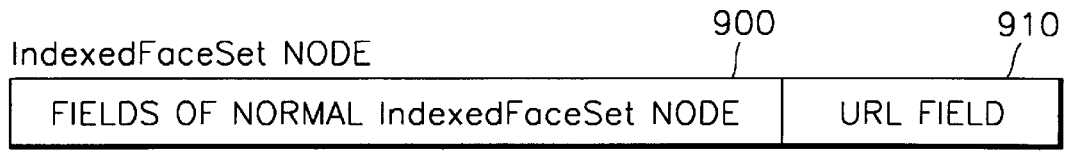

FIG. 9B

```
IndexedFaceSet{
    eventIn         MFInt32     set_colorIndex
    eventIn         MFInt32     set_coordIndex
    eventIn         MFInt32     set_normalIndex
    eventIn         MFInt32     set_texCoordIndex
    exposedField    SFNode      color             NULL
    exposedField    SFNode      coord             NULL
    exposedField    SFNode      normal            NULL
    exposedField    SFNode      texCoord          NULL
    field           SFBool      ccw               TRUE
    field           MFInt32     colorIndex        []
    field           SFBool      colorPerVertex    TRUE
    field           SFBool      convex            TRUE
    field           MFInt32     coordIndex        []
    field           SFFloat     creaseAngle       0.0
    field           MFInt32     normalIndex       []
    field           SFBool      normalPerVertex   TRUE
    field           SFBool      solid             TRUE
    field           MFInt32     texCoordIndex     []
    exposedField    MFString    url               []
    eventOut        SFBool      doneLoading
}
```

IFSConnect NODE
— 1000

```
IFSConnect{
    eventIn      MFString    url                      []
    eventOut     SFBool      doneLoading
}
```

FIG. 11A

FIG. 11B

```
CompressedIFS{ eventIn         MFInt32     set_colorIndex
    eventIn         MFInt32     set_coordIndex
    eventIn         MFInt32     set_normalIndex
    eventIn         MFInt32     set_texCoordIndex
    exposedField    SFNode      color           NULL
    exposedField    SFNode      coord           NULL
    exposedField    SFNode      normal          NULL
    exposedField    SFNode      texCoord        NULL
    field           SFBool      ccw             TRUE
    field           MFInt32     colorIndex      []
    field           SFBool      colorPerVertex  TRUE
    field           SFBool      convex          TRUE
    field           MFInt32     coordIndex      []
    field           SFFloat     creaseAngle     0.0
    field           MFInt32     normalIndex     []
    field           SFBool      normalPerVertex TRUE
    field           SFBool      solid           TRUE
    field           MFInt32     texCoordIndex   []
    exposedField    MFString    url             []
    eventOut        SFBool      doneLoading
}
```

METHOD FOR PROCESSING NODES IN 3D SCENE AND APPARATUS THEREOF

Priority is claimed to Korean Patent Applications Nos. 00-12849, 00-39266 and 01-11473 filed on Mar. 14, 2000, Jul. 10, 2000 and Mar. 6, 2001, respectively, herein incorporated by reference.

BACKGROUND OF THE INVENTION

1. Field of the Invention

The present invention relates to a method for processing nodes in 3-dimensional (3D) scene and an apparatus thereof, and more particularly, to a method for processing nodes representing 3D mesh information among nodes in a 3D scene and an apparatus thereof.

2. Description of the Related Art

Though 3D graphics is widely used recently, the scope of application is limited due to the huge volume of its information. That is, to represent 3D mesh information, geometry information of each point, connectivity information between each point, and information on properties such as color tones, normals, and texture coordinates. Generally, due to the huge volume of this information, it has been needed to encode this information, and for this, a 3D mesh coding (3DMC) apparatus, which has been adopted as a standard of International Organization for Standardization/International Electrotechnical Commission (ISO/IEC) by Moving Picture Expert Group-Synthetic and Natural Hybrid Coding (MPEG-4-SNHC) part, encodes and decodes 3D mesh information, which can be represented by IndexedFaceSet, to provide enhanced efficiency of transmission and encoding.

Meanwhile, the MPEG-4 system part is standardizing a Binary Format for Scene (BIFS) as a scene description language for specifying the expression method and properties of an object. The scene description language includes a Virtual Reality Modeling Language (VRML) and Web3D in addition to the BIFS.

In the BIFS of the MPEG-4 system and VRML, a 3D scene can be formed and the 3D scene contains an IndexedFaceSet node to represent 3D mesh information.

However, in the BIFS, 3D scene information having the huge volume of IndexedFaceSet information is simply compressed into binary codes, and in the VRML, is stored and transmitted after represented in the form of ASCII characters.

Therefore, in the MPEG-4 system, when 3D scene information including an IndexedFaceSet node having the huge volume of 3D mesh information is transmitted to a terminal through a BIFS stream, due to the huge volume of the IndexedFaceSet node information, transmission delays or decoding delays can occur, and therefore can cause a problem in which 3D scene information cannot be restored in a predetermined time.

In addition, even though this information is encoded, the volume of a large volume 3D mesh can be greater than that of other information contained in the 3D scene, and if encoded 3D mesh information is transmitted together with 3D scene description information in one stream, the transmission of the entire 3D scene can be affected.

SUMMARY OF THE INVENTION

To solve the above problems, it is an object of the present invention to provide a method for efficiently encoding and decoding a node representing 3D mesh information having a huge volume of information in a 3D scene so that the 3D scene can be efficiently transmitted and stored.

It is another object to provide a method for transmitting and storing the 3D mesh information of a node, which represents 3D mesh information contained in a 3D scene, through a stream separately from 3D scene description information so that the huge volume of 3D mesh information cannot affect the transmission of the entire 3D scene.

To accomplish the above object of the present invention, there is provided a method for processing a node contained in a 3-dimensional (3D) scene, the method having the steps of identifying a 3D mesh node having 3D mesh information representing a 3D shape which is formed by constructing faces from vertices among nodes contained in a 3D scene to be processed; and encoding or decoding the identified 3D mesh node.

It is preferable that the method further includes a step of identifying a 3D mesh node, in which a 3D mesh coding identifier is set, among the identified 3D mesh nodes, in which in the step for encoding or decoding the identified 3D mesh node, the 3D mesh node, in which a 3D mesh coding identifier is set, is encoded or decoded.

It is preferable that the step for encoding or decoding the identified 3D mesh node, the 3D mesh node is encoded or decoded using a 3D mesh encoder/decoder.

It is preferable that the method further includes a step of transmitting or storing the 3D mesh information of the encoded 3D mesh node through a 3D scene description stream.

It is preferable that the method further includes a step of arranging a 3D mesh encoder/decoder within a 3D scene description encoder/decoder so that the 3D mesh information of the encoded 3D mesh node which is transmitted through the 3D scene description stream, is encoded or decoded.

It is preferable that the method further includes a step of transmitting or storing the 3D mesh information of the encoded 3D mesh node through an independent stream separate from the 3D scene description stream.

It is preferable that the method further includes a step of arranging an independent 3D mesh encoder/decoder separate from the 3D scene description encoder/decoder so that the 3D mesh information of the encoded 3D mesh node, which is transmitted in the independent stream separate from the 3D scene description stream, is encoded or decoded.

It is preferable that the method further includes the steps of transmitting or storing 3D mesh information of some 3D mesh nodes among the encoded 3D mesh nodes, through the 3D scene description stream; and transmitting or storing 3D mesh information of some 3D mesh nodes among the encoded 3D mesh nodes, through an independent stream separate from the 3D scene description stream.

It is preferable that the method further includes the steps of embedding and arranging a 3D mesh encoder/decoder within the scene description encoder/decoder so that the 3D mesh information of some 3D mesh nodes among the encoded 3D mesh nodes, which is transmitted through the 3D scene description stream, is encoded or decoded; and arranging another 3D mesh encoder/decoder separate from the scene description encoder/decoder so that the 3D mesh information os some mesh nodes among the encoded 3D mesh nodes, which is transmitted through the independent stream separate from the 3D scene description stream, is encoded or decoded.

It is preferable that the 3D mesh node contains the Uniform Resource Locator (URL) of the independent stream through which the 3D mesh information of the encoded 3D mesh node is transmitted, and the step for encoding or decoding the 3D mesh node includes a step for encoding or decoding the 3D mesh node referring to the URL contained in the 3D mesh node.

It is preferable that the 3D mesh node contains the URL of the independent stream through which the 3D mesh information of the encoded 3D mesh node is transmitted.

To accomplish another object of the present invention, there is also provided a method for processing a node contained in a 3D scene, the method having the steps of generating a compression 3D mesh node for compressing a 3D mesh node having 3D mesh information representing a 3D shape, which is formed by constructing faces from vertices among nodes contained in a 3D scene; identifying the compression 3D mesh node among nodes contained in a 3D scene to be processed; and encoding or decoding the identified compression 3D mesh node using a 3D mesh encoder/decoder.

To accomplish another object of the present invention, there is also provided an apparatus for processing a node contained in a 3D scene, the apparatus having a controller for identifying a 3D mesh node having 3D mesh information representing a 3D shape, which is formed by constructing faces from vertices among nodes in the 3D scene to be processed; a 3D mesh encoder/decoder for encoding or decoding the 3D mesh node identified by the controller; and a 3D scene description encoder/decoder for encoding or decoding the 3D scene node.

It is preferable that the controller further identifies the 3D mesh node in which a 3D mesh coding identifier is set, and the 3D mesh encoder/decoder encodes or decodes the 3D mesh node in which the 3D mesh coding identifier is set, among the 3D mesh nodes identified by the controller.

It is preferable that the controller transmits or stores the 3D mesh information of the encoded 3D mesh node, through a 3D scene description stream; and the 3D mesh encoder/decoder is arranged in the 3D scene description encoder/decoder.

It is preferable that the controller transmits or stores the 3D mesh information of the encoded 3D mesh node, through an independent stream separate from the 3D scene description stream; and the 3D mesh encoder/decoder is independently arranged separately from the 3D scene encoder/decoder.

It is preferable that the controller transmits and stores the 3D mesh information of some 3D mesh nodes among the encoded 3D mesh nodes, through the 3D scene description stream, and transmits or stores the 3D mesh information of some 3D mesh nodes among the encoded 3D mesh nodes, through an independent stream separate from the scene description stream, and transmits or stores the 3D mesh information, and the 3D mesh encoder/decoder is arranged in the 3D scene description encoder/decoder, and another 3D mesh encoder/decoder is independently arranged separately from the 3D scene description encoder/decoder.

It is preferable that the 3D mesh information of the 3D mesh node, which is transmitted through the 3D scene description stream, is encoded or decoded by the 3D mesh encoder/decoder arranged in the 3D scene description encoder/decoder, and the 3D mesh information of the 3D mesh node, which is transmitted through the independent stream separate from the 3D scene description stream, is encoded or decoded by the independently arranged 3D mesh encoder/decoder.

It is preferable that the 3D mesh node contains the URL of an independent stream, through which the 3D mesh information of the encoded 3D mesh node is transmitted, so that the 3D mesh information of the encoded 3D mesh node is transmitted through the independent stream, and the 3D mesh encoder/decoder encodes or decodes the 3D mesh node referring to the URL contained in the 3D mesh node.

To accomplish another object of the present invention, there is also provided an apparatus for processing a node contained in a 3D scene, the apparatus having a controller for generating a compression 3D mesh node for compressing a 3D mesh node having 3D mesh information representing a 3D shape, which is formed by constructing faces from vertices among nodes in a 3D scene and identifying the compression 3D mesh node among nodes contained in a 3D scene to be processed; a 3D mesh encoder/decoder for encoding or decoding the identified compression 3D mesh node; and a 3D scene encoder/decoder for encoding or decoding the nodes contained in the 3D scene excluding the compression 3D mesh nodes.

It is preferable that a platform for implementing the 3D scene includes Virtual Reality Modeling Language (VRML), BInary Format for Scene (BIFS), and Web3D.

It is preferable that the 3D mesh node includes an IndexedFaceSet node.

BRIEF DESCRIPTION OF THE DRAWINGS

The above objects and advantages of the present invention will become more apparent by describing in detail preferred embodiments thereof with reference to the attached drawings in which:

FIG. 7A shows the structure of the normal IndexedFaceSet node, and FIG. 7B shows in detail fields forming an IndexedFaceSet node interface shown in FIG.

FIG. 9A shows an example of the structure of an IndexedFaceSet node in which a URL field is added to the fields of a normal IndexedFaceSet node, and FIG. 9B shows in detail fields forming an IndexedFaceSet node interface shown in FIG. 9A;

FIG. 11A shows an example of the structure of a CompressedIFS node, newly generated by adding a URL field to the normal IndexedFaceSet node field, and FIG. 11B shows in detail fields forming a CompressedIFS node interface shown in FIG. 11A;

DETAILED DESCRIPTION OF THE INVENTION

The example of an IndexedFaceSet node of the BIFS in the MPEG-4 system part will now be explained mainly. However, this is just an example for showing a node for representing 3D mesh information by representing a 3D shape which is formed by constructing faces from vertices. The applications of the present invention are not restricted to this IndexedFaceSet node, and include any nodes for representing a 3D shape, which is formed by constructing faces from vertices in a 3D scene, which can be clearly understood by anyone skilled in the technology field of the present invention.

Hereinafter, embodiments of the present invention will be described in detail with reference to the attached drawings.

Figure 1:
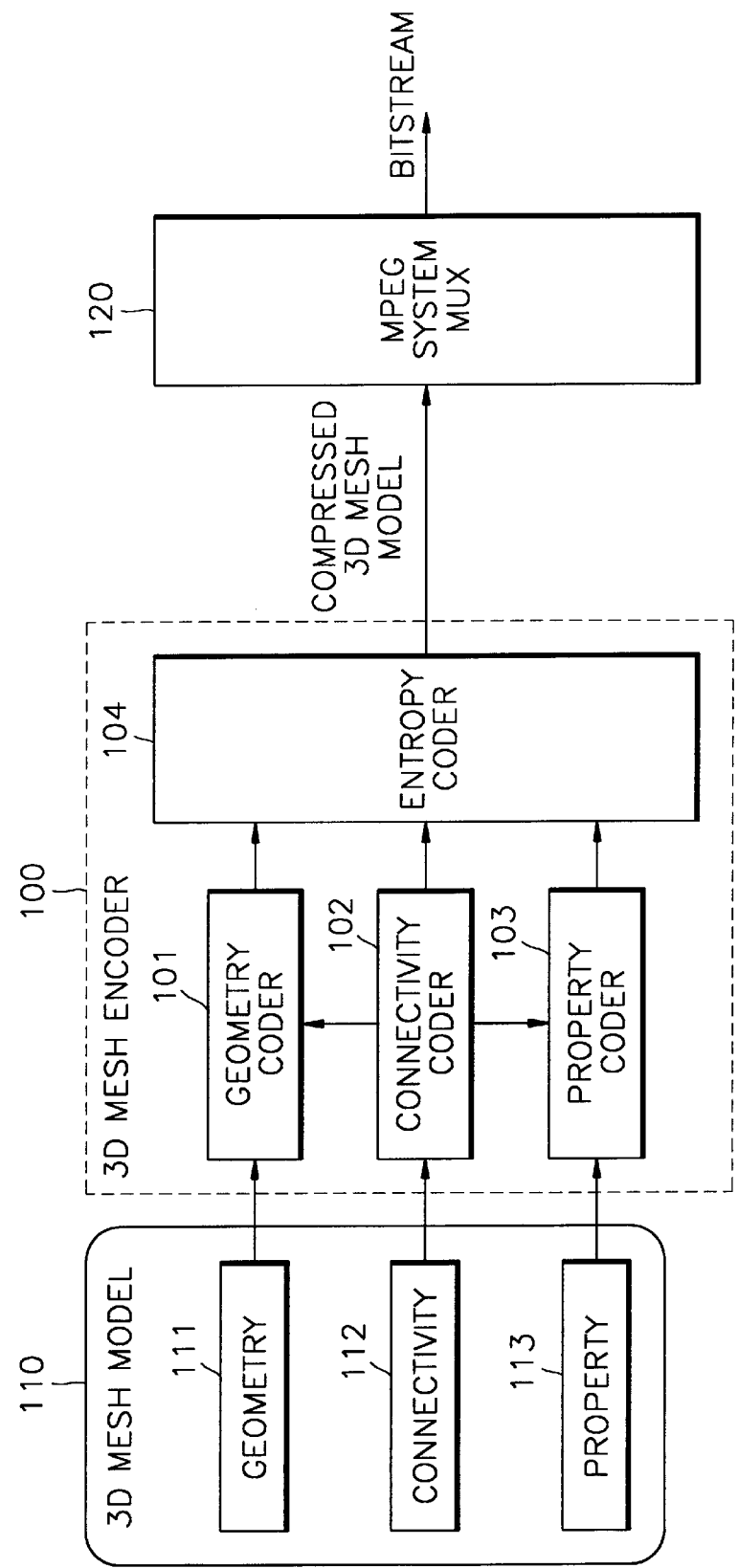
FIG. 1 is a block diagram of a 3-dimensional (3D) mesh encoder.
Figure 2:
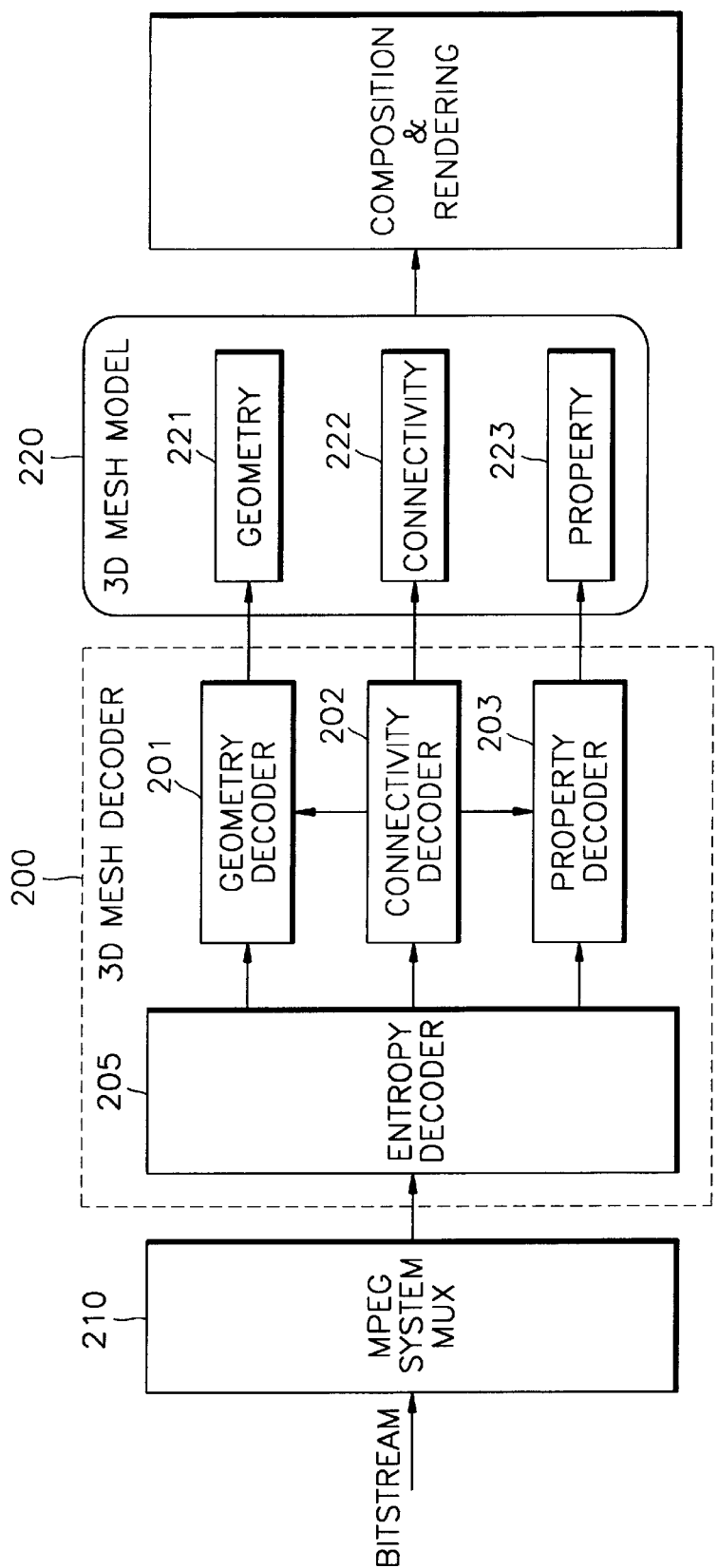
FIG. 2 is a block diagram of a 3D mesh decoder.

A 3D mesh encoder and decoder, provided by the MPEG-4 SNHC part to represent an IndexedFaceSet node, are shown respectively in FIGS. 1 and 2. The 3D mesh encoder and decoder, which are used in the MPEG-4 SNHC part as shown in FIGS. 1 and 2, are used in a node contained in a 3D scene description in the present invention.

FIG. 1 shows a 3D mesh encoder 100. 3D mesh information containing geometry information, connectivity information, and property information, is encoded to form a compressed 3D mesh model by the 3D mesh encoder 100. The 3D mesh information 110 is divided into geometry information 110, connectivity information 112, and property information 113, which then are respectively encoded by a geometry information encoder 101, a connectivity information encoder 102, and an property information encoder 103, and synthetically form a finally encoded 3D mesh model through an entropy encoder 104.

FIG. 2 shows a 3D mesh decoder 200. The encoded 3D mesh information input in the form of a bit stream is decoded to restore a 3D mesh model containing geometry information 221, connectivity information 222, and property information 223, by the 3D mesh decoder 200. That is, each information decoded by an entropy decoder 204 is decoded respectively through a geometry information decoder 201, a connectivity information decoder 202, and an property information decoder 203 and then the 3D mesh model 220 is restored.

Figure 3:
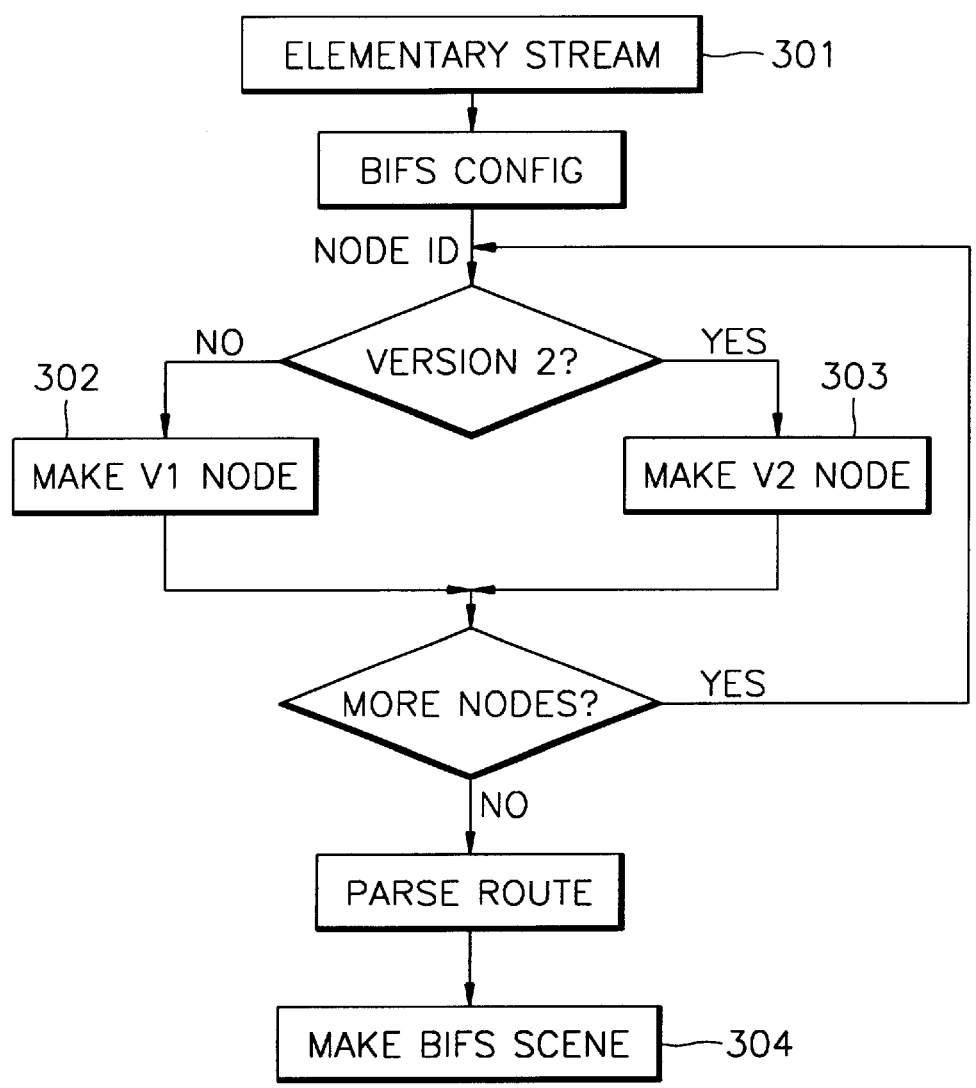
FIG. 3 is a flowchart for a process of generating a BInary Format for Scene (BIFS) scene from an element stream.

FIG. 3 shows a flow for generating a BIFS scene 304 by interpreting each node of 3D scenes transmitted in elementary streams (ES) in the MPEG-4 system part.

The MPEG-4 uses a client-server model, an MPEG-4 client (or player or browser) accesses an MPEG-4 server, requests a content, receives the content, and renders the content. This content can be formed of video data, audio data, a still picture, synthesized 2D or 3D data, or combination thereof. Scene description is a method for combining all this data in a receiving terminal so that all this data can be displayed on a user screen, and reproduced in a user speaker.

In the VRML or the BIFS, a scene is represented by various sets of nodes arranged in the form of trees, each node is formed of a list of fields for representing each object contained in a scene and defining predetermined actions of a node. An elementary stream transports each object data, scene description information, or control information related to objects.

Also in the MPEG-4 system part, the type of a node is identified using two current version values. Since an identifier (NodeCode) for identifying a node type is differently defined according to each version value, an interpreter for nodes exists for each version.

In FIG. 3, BIFS forming information is found in elementary streams in step 301. According to the type of a node to be processed when nodes in each scene are processed, version 1 interpreter or version 2 interpreter interprets nodes in step 302 or 303. If there are no more remaining nodes to be processed, a route is parsed and a BIFS scene is formed in step 304.

Figure 4:
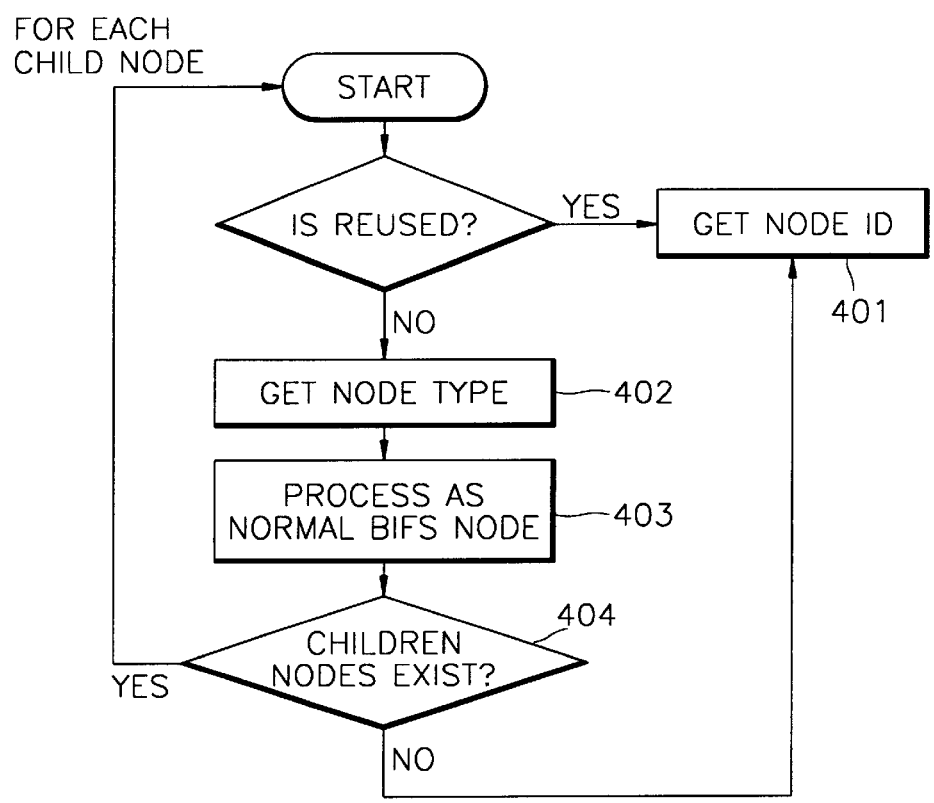
FIG. 4 is a flowchart for a process of interpreting a node in a BIFS scene.

In general, the node interpreters 302 and 303 shown in FIG. 3 are implemented to perform a process shown in FIG. 4. Each of the VRML and BIFS has a mechanism for reuse a node. If a node to be processed is a node to be reused, a corresponding node ID is fetched in step 401, and if a node to be processed is a new node, the type of the node is obtained in step 402 and then according to the type, the node is processed in step 403. If the current node has children nodes 404, each child node is processed in the same method.

Figure 5:
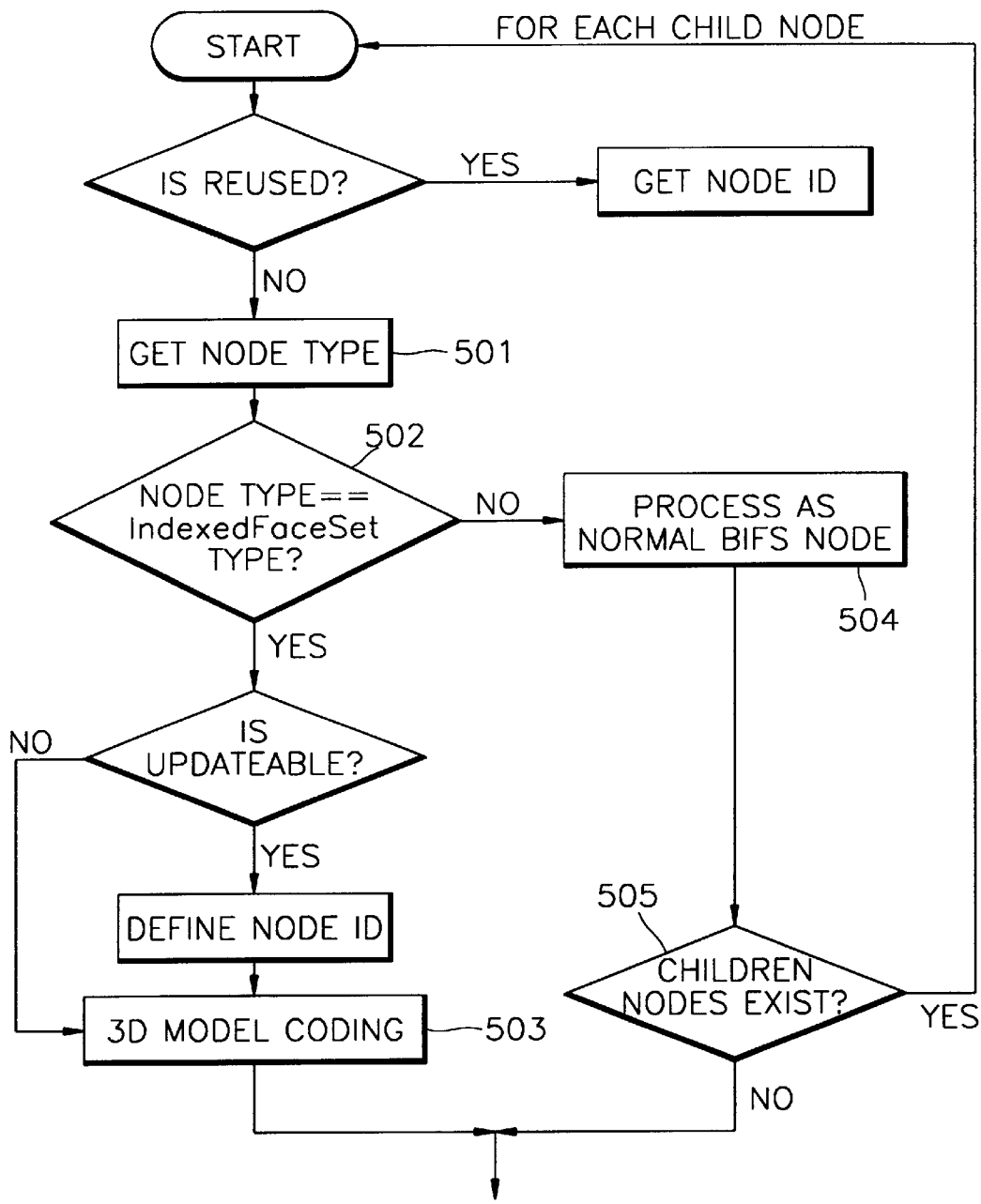
FIG. 5 is a flowchart of a node interpreter for processing IndexedFaceSet node information using 3D mesh coding (3DMC)

To encode and decode an IndexedFaceSet node using a 3D mesh encoder and decoder in the MPEG-4 system part, the version 2 node interpreter 303 can be implemented to perform a process shown in FIG. 5. The type of a node to be processed is checked 501. If the node type is IndexedFaceSet in step 502, the IndexedFaceSet node is encoded and decoded using a 3D mesh encoder and decoder in step 503. If the node type is not IndexedFaceSet, the node is processed in the normal BIFS node processing method in step 504. If the current node has children nodes in step 505, each child node is processed in the same method.

Figure 6:
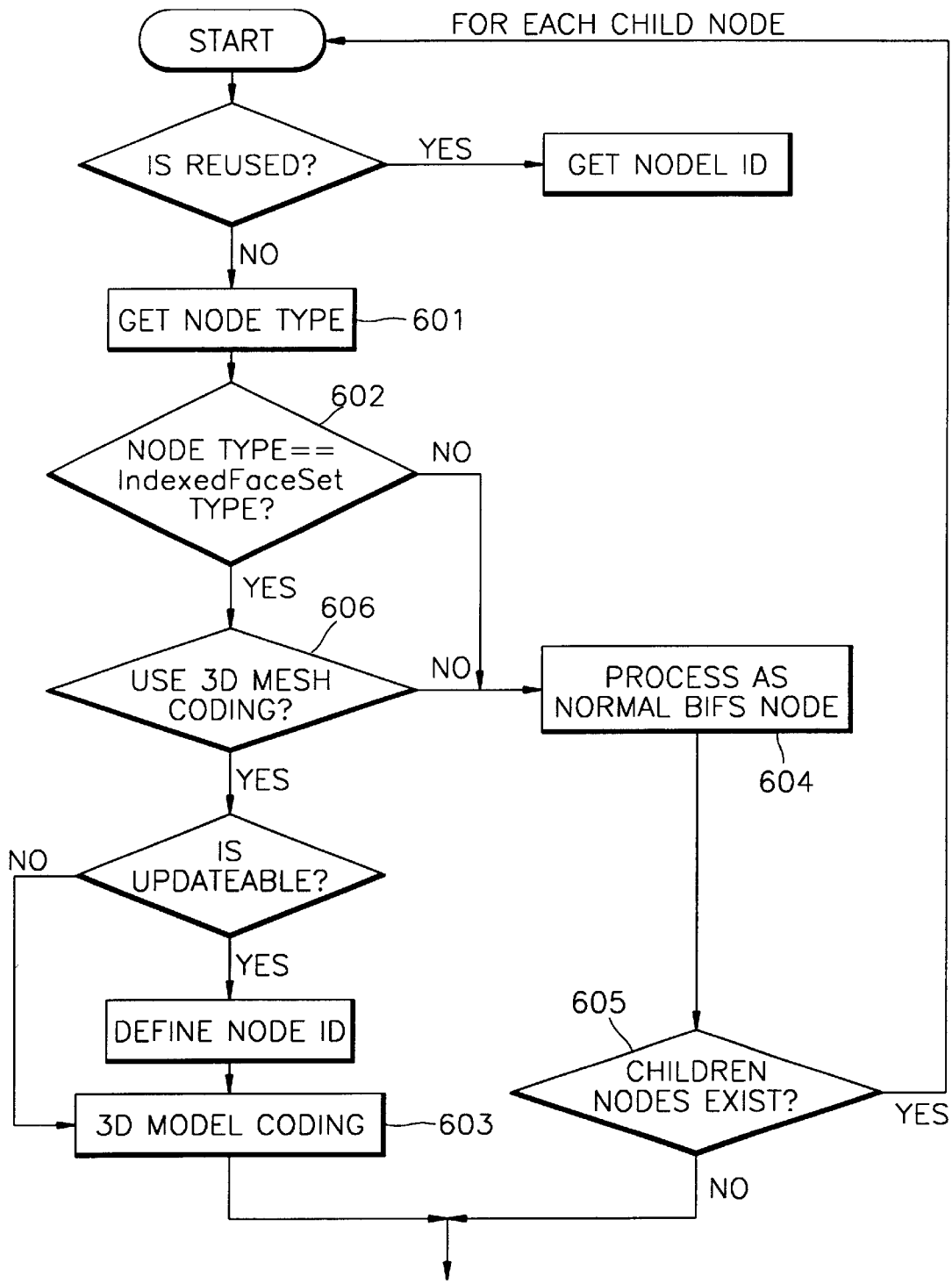
FIG. 6 is a flowchart of a node interpreter for processing IndexedFaceSet node information optionally using 3DMC.

To encode and decode an IndexedFaceSet node using a 3D mesh encoder and decoder in the MPEG-4 system part, the version 2 node interpreter 303 can be implemented to perform another process shown in FIG. 6. The type of a node to be processed is checked in step 601. If the type of a node is IndexedFaceSet in step 602, a 3D mesh coding identifier (use3DMeshCoding) signal, which indicates a method for processing an IndexedFaceSet node, is referred to from BIFS configuration information in step 606. If the 3D mesh coding identifier signal is set, the IndexedFaceSet node is encoded and decoded using a 3D mesh encoder and decoder in step 603. However, if the type of a node to be processed is not IndexedFaceSet, or if the 3D mesh coding identifier is not set, the node is processed in the normal BIFS node processing method in step 604. If the current node has children nodes in step 505, each child node is processed in the same method.

In the node interpreter of FIG. 5, all IndexedFaceSet nodes contained in a scene is encoded/decoded by a 3D mesh encoder/decoder. However, the node interpreter of FIG. 6 is different from that of FIG. 5 in that in the node interpreter of FIG. 6, all IndexedFaceSet nodes contained in a scene are not 3D mesh encoded/decoded, and IndexedFaceSet nodes, which are not 3D mesh encoded/decoded, can be included. That is, in the node interpreter of FIG. 6, a 3D mesh coding identifier is contained in information on an IndexedFaceSet node. If a 3D mesh coding identifier is set in an IndexedFaceSet node, the node is 3D mesh encoded/decoded, and if a 3D mesh coding identifier is not set, the node is not 3D mesh encoded/decoded, which is different from the process in the node interpreter of FIG. 5.

Another method for encoding and decoding IndexedFaceSet node information using a 3D encoder and decoder in the MPEG-4 system part is maintaining a normal IndexedFaceSet node without change and generating a new node for encoding the IndexedFaceSet node In this case, the normal IndexedFaceSet node is processed by the normal BIFS node processing method using the node interpreter shown in FIG. 4, and the newly generated node, for example, a newly generated CompressedIFS node to be explained now as shown in FIG. 11, is encoded and decoded using a 3D mesh encoder/decoder.

Figures 8A, 8B:
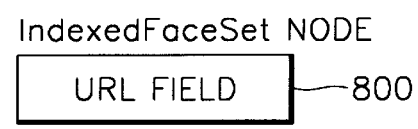
FIG. 8A shows an example of the structure of an IndexedFaceSet node using a Universal Resource Locator (URL)
FIG. 8B shows in detail fields forming an IndexedFaceSet node interface shown in FIG. 8A.
Figures 10A, 10B:
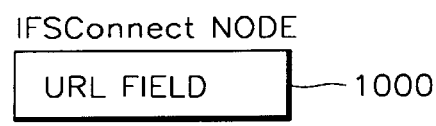
FIG. 10A shows an example of the structure of an IFSConnect node for linking a normal IndexedFaceSet node.
FIG. 10B shows in detail fields forming an IFSConnect node interface shown in FIG. 10A.

FIG. 7 shows an IndexedFaceSet node interface used to represent a 3D mesh in the current 3D scene, and FIGS. 8 through 11 show IndexedFaceSet node interfaces generated according to the present invention. IndexedFaceSet nodes shown in FIGS. 8 and 9 show newly generated node interfaces which replace normal IndexedFaceSet node interfaces. In FIGS. 10 and 11, new node interfaces are added while the normal IndexedFaceSet nodes are used without change.

An IndexedFaceSet node interface can be implemented as shown in FIG. 8 so that encoded 3D mesh information can be transmitted using a stream separately from 3D scene description information not to affect the entire 3D scene.

In the IndexedFaceSet node of FIG. 8, all fields of the normal IndexedFaceSet node are removed and a Uniform Resource Locator (URL) field 800, which can link the IndexedFaceSet node to another stream, is included. In this URL field 800, information which can find a stream containing all field information of the normal IndexedFaceSet node, is recorded. Therefore, 3D mesh information of an IndexedFaceSet node is transmitted through a separate independent stream and when the IndexedFaceSet node is processed, the URL field, which has location information of the independent stream, through which the 3D mesh information of the IndexedFaceSet node is transmitted, is referred to.

Another method to transmit 3D mesh information through a separate stream is to implement an IndexedFaceSet node interface as shown in FIG. 9. The IndexedFaceSet node interface of FIG. 9 includes all fields 900 contained in the normal IndexedFaceSet node and further includes a URL field 910. This is combination of the nodes in FIGS. 7 and 8. Using the URL field 910, 3D mesh information can be transmitted through a separate encoded stream, or encoded 3D mesh information using normal IndexedFaceSet node fields 900 can be transmitted through a scene description stream. Meanwhile, 3D mesh information contained in the normal IndexedFaceSet node fields can be transmitted, without encoding, through a scene description stream.

Another method to transmit 3D mesh information through a separate stream is maintaining an IndexedFaceSet node interface in the normal method as shown in FIG. 7, and generating a new link node in the form shown in FIG. 10. In this method, IFSConnect node, which is a link node having a URL field 1000, is generated, and the URL field has information for finding a stream in which IndexedFaceSet information is transmitted. Then, the IFSConnect node is inserted into the previous location of the IndexedFaceSet node in a 3D scene. When a 3D scene is interpreted later, if a node to be processed is an IndexedFaceSet node, an IFSConnect link node, which appears previously, is referred to, and a stream having IndexedFaceSet information can be found from the URL field of the link node. Substantially, the contents of the fields of the IndexedFaceSet node of FIG. 8 are the same as the contents of the fields of the IndexedFaceSet node of FIG. 9. However, a new type of IndexedFaceSet node is generated in FIG. 8, while only a link node is newly generated with the normal IndexedFaceSet node being maintained in FIG. 10.

Another method to transmit 3D mesh information through a separate stream is generating a new node as shown in FIG. 11 as a node having the node interface as shown in FIG. 9. That is, an IndexedFaceSet node is not encoded and is maintained to represent 3D mesh information as the normal method, and a new node for encoding 3D mesh information is defined and used.

A CompressedIFS node shown in FIG. 11 includes the fields 1100 of the normal IndexedFaceSet node and a URL field 1110. By using the URL field contained in the CompressedIFS field, 3D mesh information can be transmitted through an independent stream, or by using the normal IndexedFaceSet fields 110 contained in the CompressedIFS node, 3D mesh information can be transmitted through a 3D scene description stream.

Figure 12:
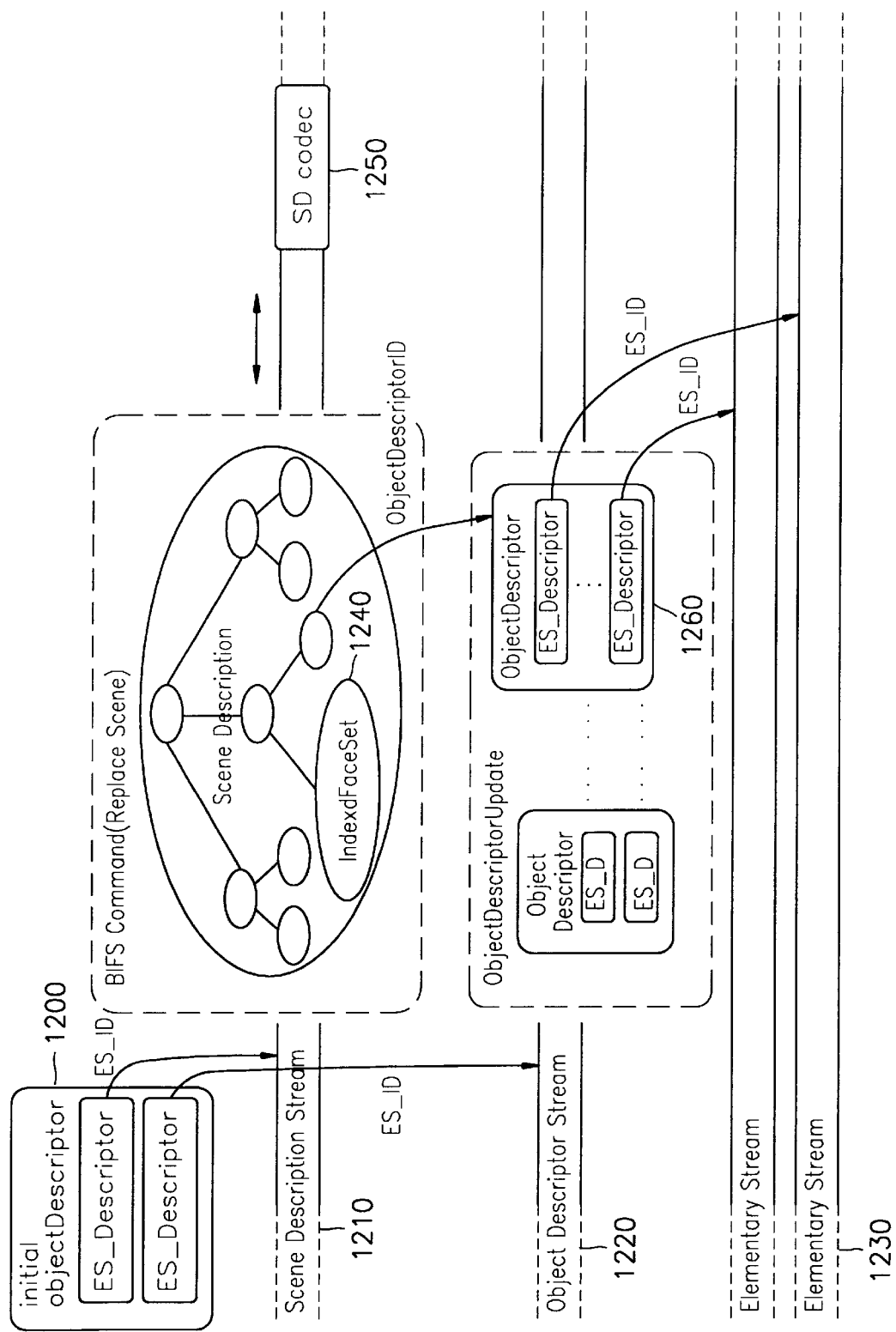
FIG. 12 is a conceptual diagram of a process in which the IndexedFaceSet node of scene description is processed by the conventional method.

FIG. 12 is a conceptual diagram of a method for processing a scene description node by the conventional method, and FIGS. 13 through 20 are conceptual diagrams of methods for processing each scene description node based on the node structure according to the present invention.

In the BIFS and VRML, a scene is formed by a set of nodes all arranged in a hierarchical tree structure, and each node is formed of a list of fields, each of which represents, groups, and changes the objects of the scene, and defines predetermined actions of a node.

In an object descriptor (OD) of an object descriptor stream 1220, one or more ES_descriptors, each of which is information on an elementary stream (ES), are contained, and using ES_ID, each of these ES_descriptors finds an elementary stream 1230 having a corresponding object. An initial object descriptor 1200 has ES_descriptors on a scene description stream 1210 and an object descriptor stream 1220. When a node in scene description (SD) searches for information on another stream, the node finds a corresponding stream through an object descriptor in the object descriptor stream.

The IndexedFaceSet node 1240 of scene description shown in FIG. 12 uses the normal node interface as shown in FIG. 7, and this information is included in an SD stream 1210 and transmitted to or from an SD codec (scene description encoder/decoder 1250) together with other scene description information. For convention of explanation, a scene description stream input to the SD codec will now be explained. However, since the SD codec shown in FIGS. 12 through 20 has a scene description encoder and decoder, and 3DMC has a 3D mesh encoder and decoder, an encoded stream is input to the scene description decoder or the 3D mesh decoder, and output from the scene description encoder or the 3D mesh encoder.

Figure 13:
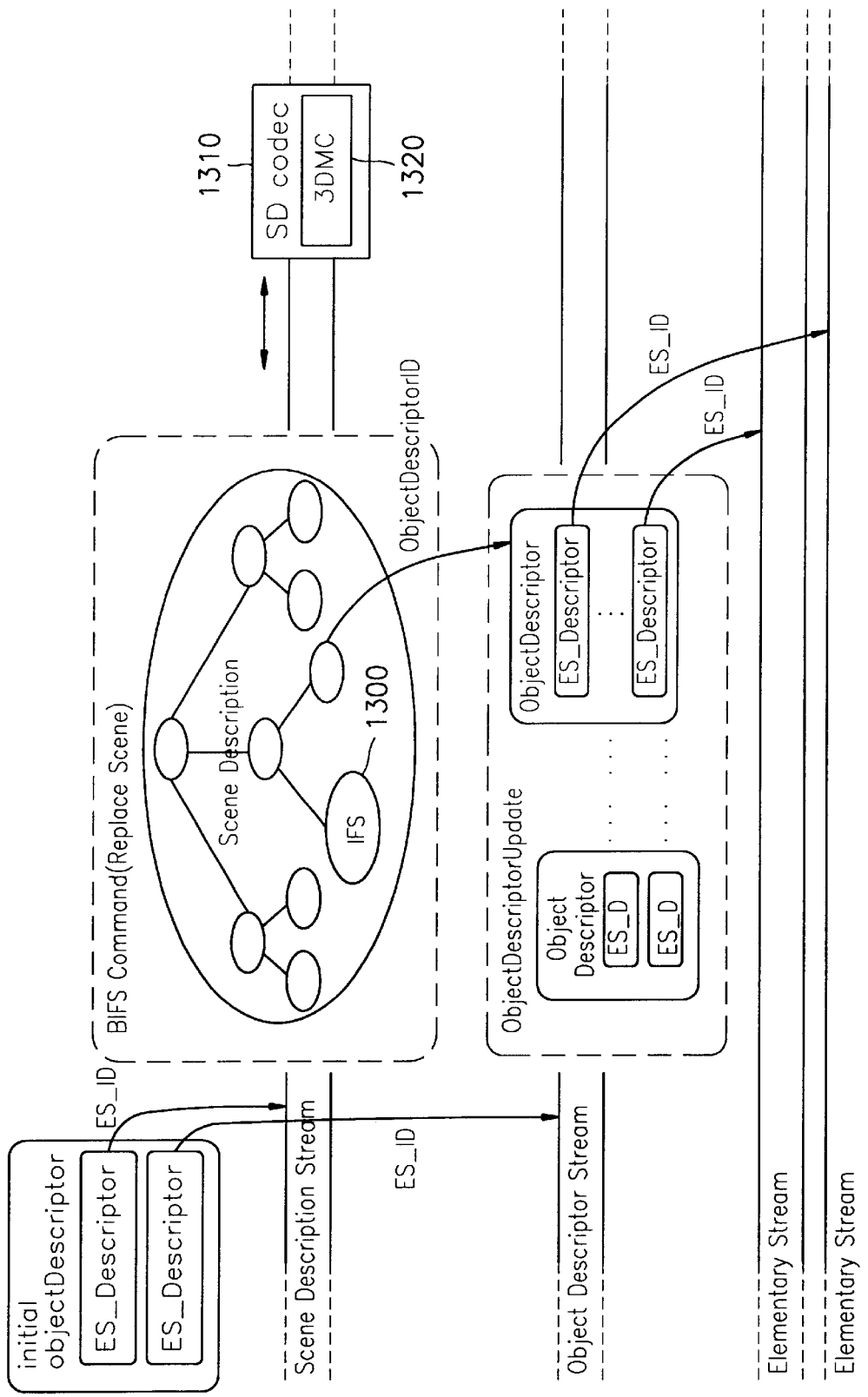
FIG. 13 is a conceptual diagram of a process in which the IndexedFaceSet node of scene description is processed by a first embodiment of the present invention.

FIG. 13 is a conceptual diagram of a structure in which according to a first embodiment of the present invention, all IndexedFaceSet nodes of scene description are 3DMC encoded/decoded and 3DMC 1320 is arranged in the SD codec 1410. In the first embodiment, an IndexedFaceSet node 1300 has the normal node interface, as shown in FIG. 7, without change, and a 3D mesh encoder/decoder is embeded in the SD codec 1310. Encoded 3D mesh information is transmitted together with 3D scene description information through a scene description stream. Scene description information contained in the scene description stream is decoded by the SD codec 1310, while the encoded 3D mesh information transmitted through the scene description stream is decoded by the 3DMC 1320. The scene description stream encoded by the SD codec 1310 is output from the SD codec 1310, and the 3D mesh information encoded by the 3DMC 1320 is output from the 3DMC 1320.

Figure 14:
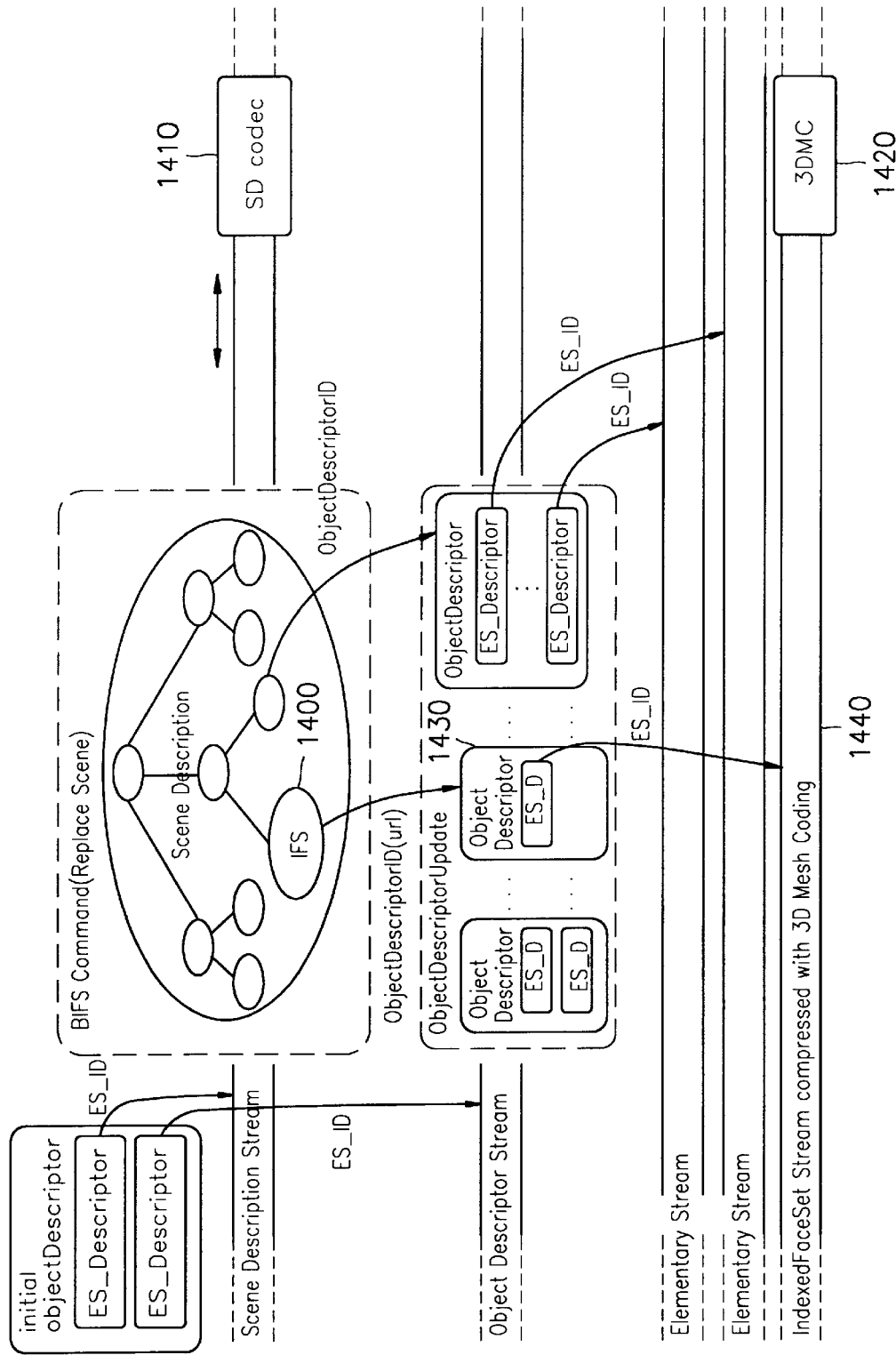
FIG. 14 is a conceptual diagram of a process in which the IndexedFaceSet node of scene description is processed by a second embodiment of the present invention.

FIG. 14 is a conceptual diagram of a structure in which according to a second embodiment of the present invention, all IndexedFaceSet nodes of scene description are 3DMC encoded/decoded and 3DMC 1420 is arranged separately from the SD codec 1410 and linked to the SD codec 1410. The IFS node 1400 of scene description includes only a URL field in the node interface as shown in FIG. 8. The URL field of the IFS node 1400 manages the object descriptor ID of an encoded 3D mesh object, and is used in finding a stream 1440 having information on a 3D mesh object encoded through the ES_descriptor in the corresponding object descriptor 1430. The IndexedFaceSet stream 1440 compressed by the 3D mesh coding is transmitted to the independent 3DMC 1420 and decoded, while scene description information in the scene description stream is transmitted to the SD codec 1410 and decoded.

Figure 15:
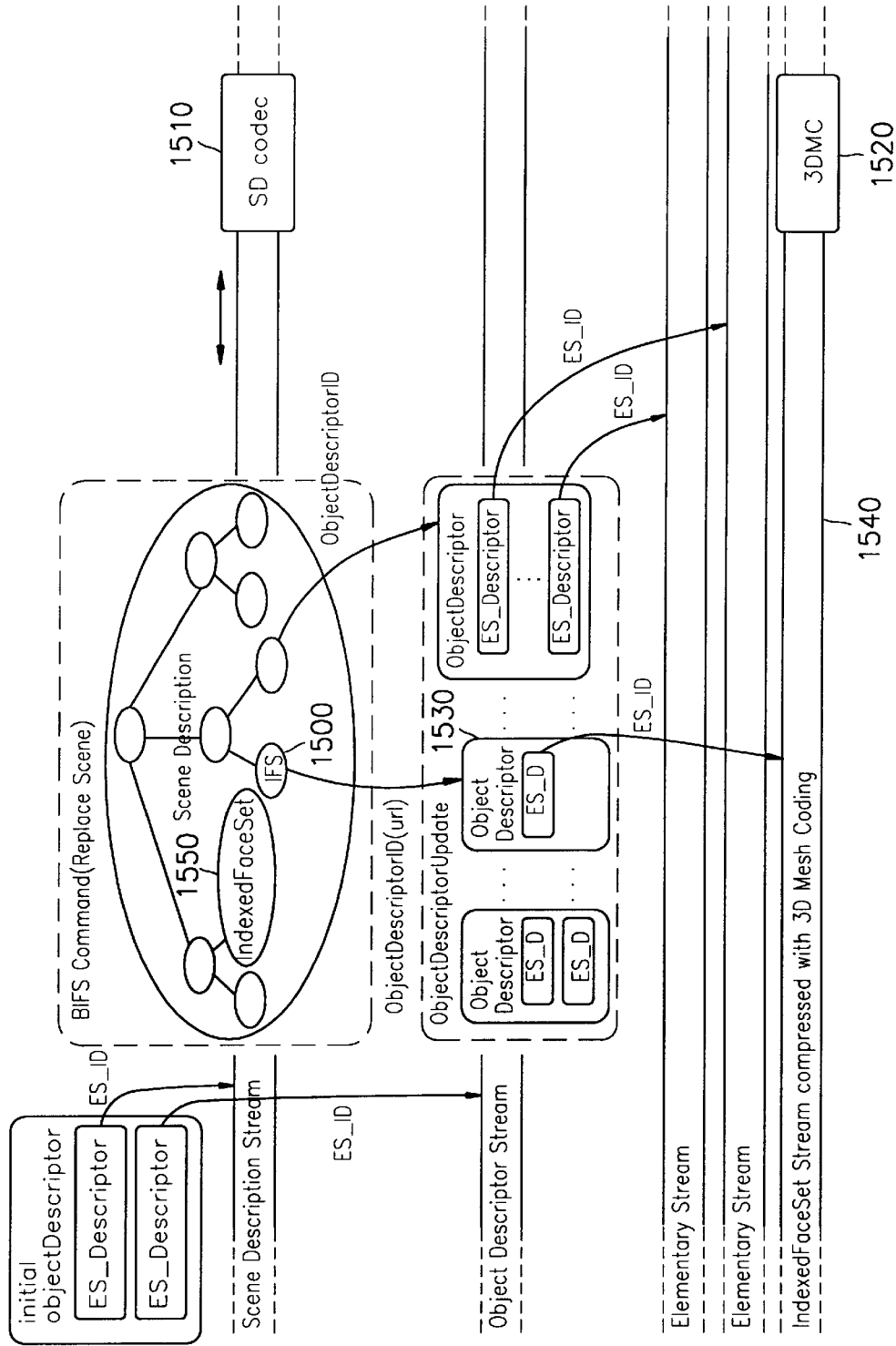
FIG. 15 is a conceptual diagram of a process in which the IndexedFaceSet node of scene description is processed by a third embodiment of the present invention.

FIG. 15 is a conceptual diagram of a structure in which according to a third embodiment of the present invention, the IFS node of scene description has an interface in which a URL field is added to the normal IndexedFaceSet node interface as shown in FIG. 9 and a 3DMC 1520 is independently arranged separately from the SD codec 1510 and linked to the SD codec 1510. The structure of FIG. 15 is different from that of FIG. 14 in that all IndxedFaceSet nodes are 3D mesh encoded/decoded in FIG. 14, while all the normal IndexedFaceSet nodes are not 3D mesh encoded/decoded in FIG. 15.

As for an IndexedFaceSet node 1550, in which the URL field contained in the IFS node is not used and 3D mesh information is represented by the fields of the normal IndexedFaceSet node, 3D mesh information of the IndexedFaceSet node is transmitted through an SD stream to the SD codec 1510 together with other SD information in scene description. As for an IFS node 1500, in which the fields of the normal IndexedFaceSet contained in the IFS node are not used and the URL field is used, encoded 3D mesh information is transmitted through a separate stream 1540 to the 3DMC 1520.

Figure 16:
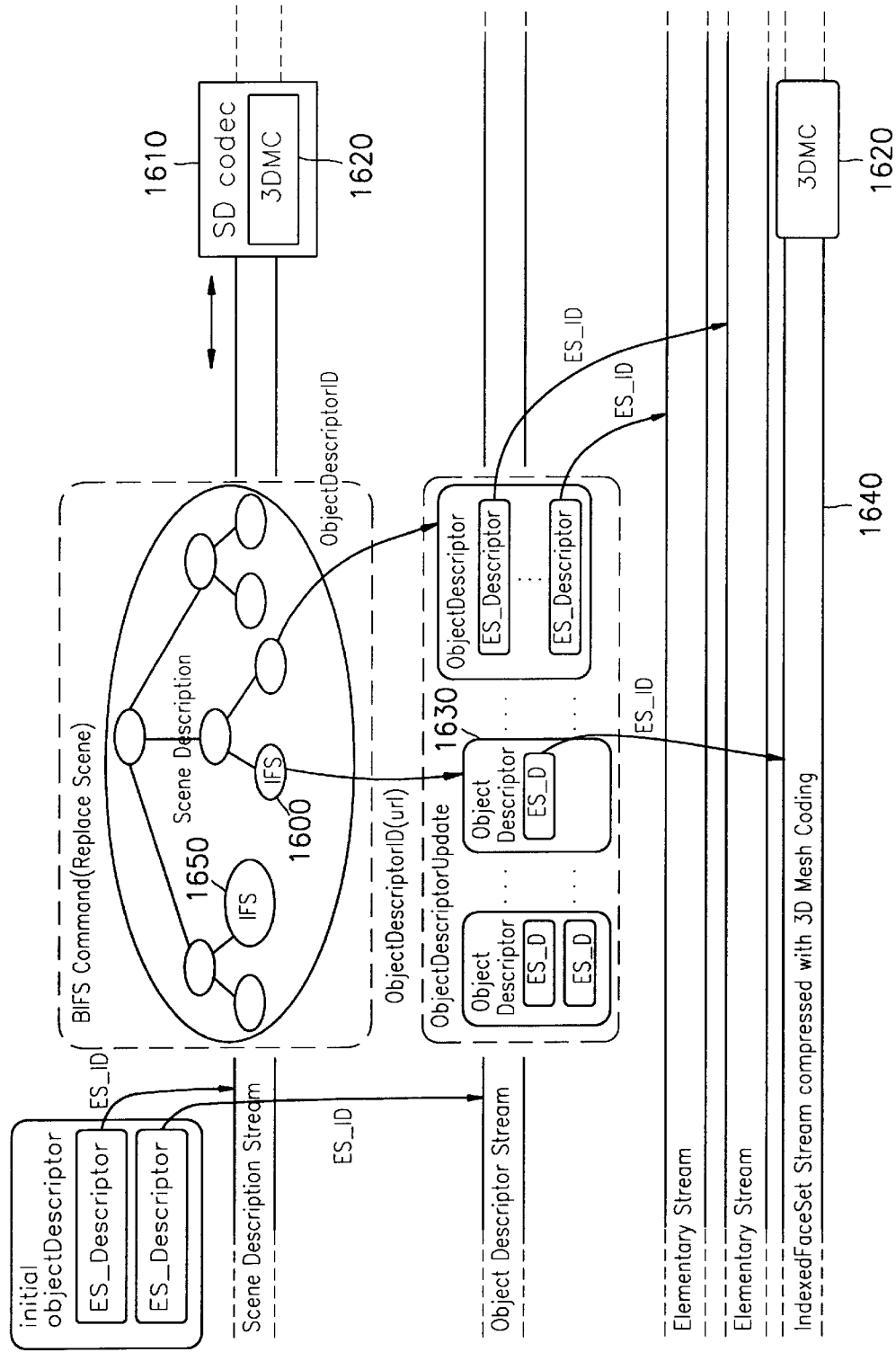
FIG. 16 is a conceptual diagram of a process in which the IndexedFaceSet node of scene description is processed by a fourth embodiment of the present invention.

FIG. 16 is a conceptual diagram of a structure in which according to a fourth embodiment of the present invention, the IFS node of scene description has an interface in which a URL field is added to the normal IndexedFaceSet node interface as shown in FIG. 9 and a 3DMC 1620 is arranged in the SD codec 1610, and the 3DMC 1620 is independently arranged separately from the SD codec 1610 and is linked to the SD codec 1610.

As for an IFS node 1600 which uses the URL field of the IFS node, encoded 3D mesh information is transmitted to the independently arranged 3DMC 1620 through a separate stream 1640. As for an IFS node 1650 which does not use the URL field of the IFS node but uses the normal IndexedFaceSet fields, the encoded 3D mesh information is transmitted through a scene description stream to the 3DMC 1620 in the SD codec 1610 and decoded.

The structure in FIG. 16 is different from that of FIG. 15 in that the encoded 3D mesh information is transmitted through a separate stream in FIG. 15, while the encoded 3D mesh information is transmitted through the scene description stream or an independent stream separate from the scene description stream in FIG. 16 because 3DMC 1620 is arranged in the SD codec 1610 and another 3DMC 1620 is arranged separately from the SD codec 1610.

Also, though both the third embodiment of FIG. 15 and the fourth embodiment of FIG. 16 use the node interface as shown in FIG. 9 as an IndexedFaceSet node interface, 3D mesh information in the third embodiment includes both encoded IndexedFaceSet nodes and not-encoded IndexedFaceSet nodes, while 3D mesh information in the fourth embodiment includes only encoded IndexedFaceSet nodes.

Figure 17:
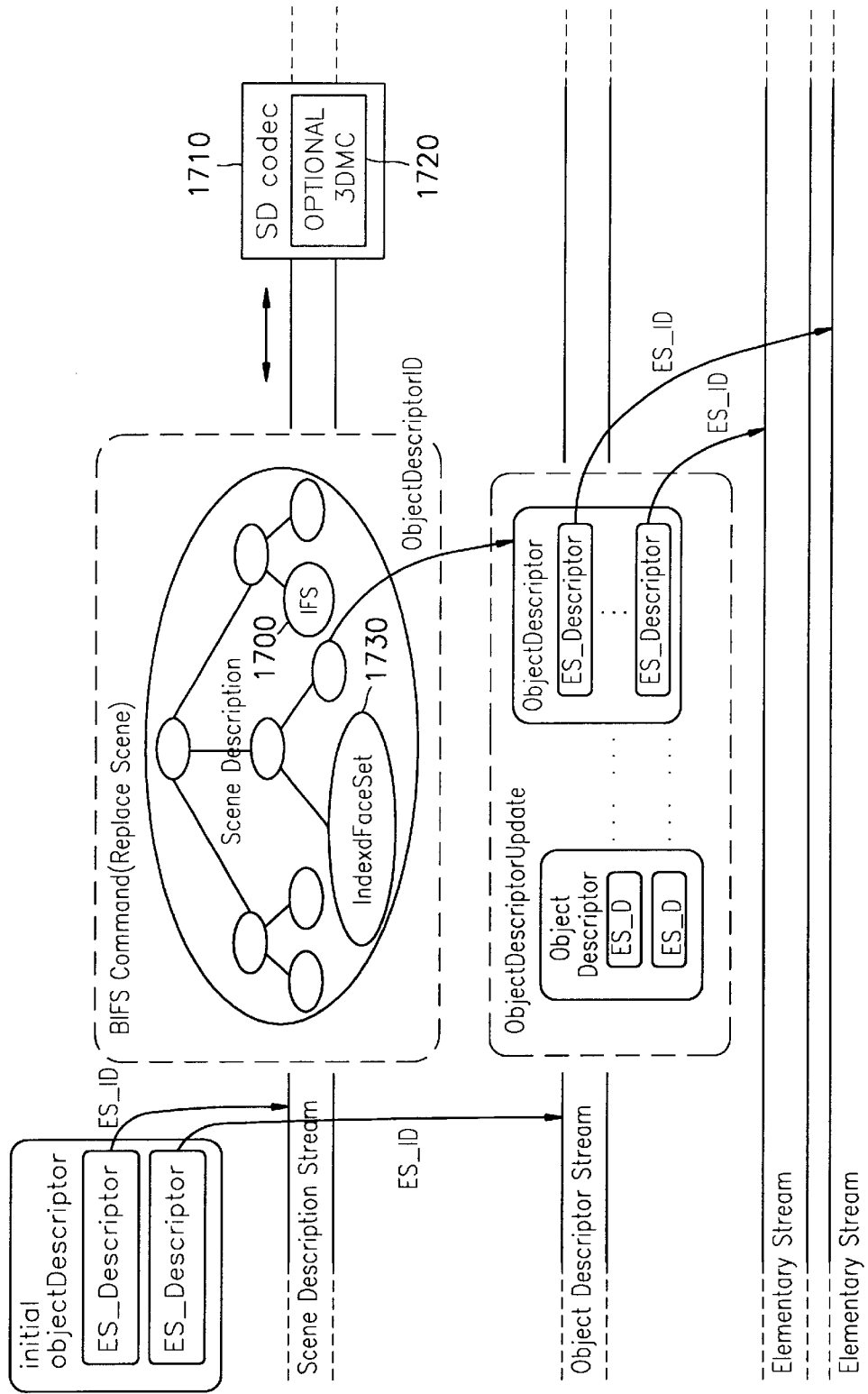
FIG. 17 is a conceptual diagram of a process in which the IndexedFaceSet node of scene description is processed by a fifth embodiment of the present invention.

FIG. 17 is a conceptual diagram of a structure in which according to a fifth embodiment of the present invention, the IFS node of scene description uses the normal IndexedFaceSet node interface as shown in FIG. 7 and an optional 3DMC 1720 is arranged in the SD codec 1710. The fifth embodiment includes both an IndexedFaceSet node 1700, which is 3D mesh encoded/decoded, and an IndxedFaceSet node 1730, which is not 3D mesh encoded/decoded.

Though the fifth embodiment basically includes the 3DMC 1720 in the SD codec 1710, all IndexedFaceSet nodes in scene description are not 3D mesh encoded/decoded, and IndexedFaceSet nodes are optionally encoded/decoded as in the node interpreter as shown in FIG. 6. That is, if a node to be processed is an IndexedFaceSet type, it is checked from BIFS configuration information whether or not a 3D mesh coding identifier is set. If a 3D mesh coding identifier is not set, 3D mesh information is transmitted through a scene description stream together with other scene description information to the SD codec 1510, and processed in the normal BIFS node processing method. If a 3D mesh coding identifier is set, 3D mesh information is also transmitted through a scene description stream together with other scene description information, to the SD codec 1510, and then decoded by the optional 3DMC 1720.

Figure 18:
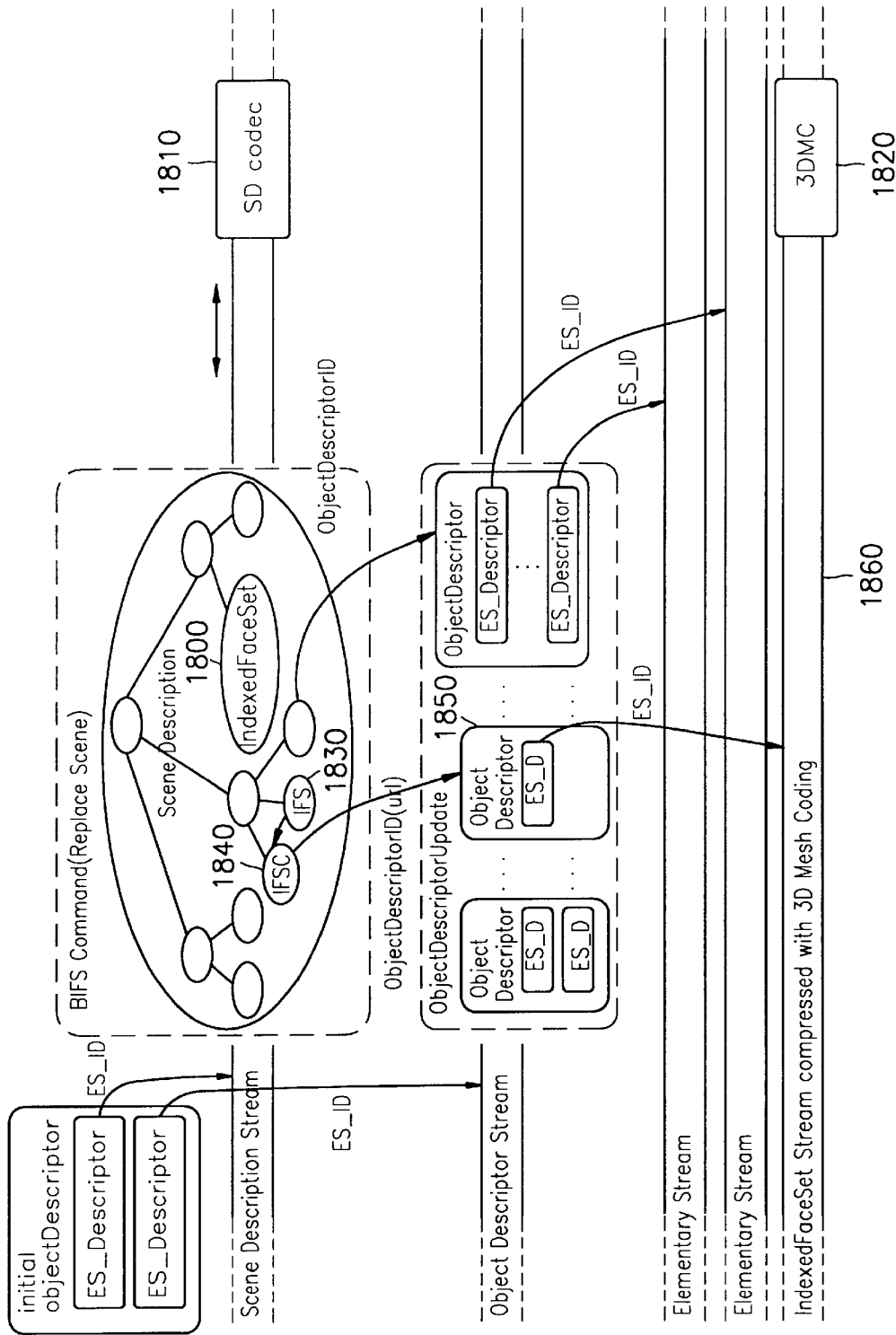
FIG. 18 is a conceptual diagram of a process in which the IndexedFaceSet node of scene description is processed by a sixth embodiment of the present invention.

FIG. 18 is a conceptual diagram of a structure in which according to a sixth embodiment of the present invention, the normal IndexedFaceSet node 1800 is contained, an IFSConnect node 1840, which is a link node for linking the IFS node 1830 to an independent stream containing 3D mesh information, is defined and used in FIG. 10, and a 3DMC 1820 is independently arranged separately from the SD codec 1810.

In the sixth embodiment, the 3D mesh information of the normal IndexedFaceSet node 1800 in scene description is transmitted through a scene description stream together with other scene description information to the SD codec 1810. The link node IFSC 1840 is inserted so as to be located in front of the IFS node in a 3D scene tree structure, and the URL field of the link node has information which enables to find the location of an independent stream 1860 through which 3D mesh information is transmitted. Actually, the fact that the URL field of the link node has information which enables to find the location of an independent stream 1860 through which 3D mesh information is transmitted means that the URL of the link node points an object descriptor and ES_descriptor of the object descriptor has information which enables to find a stream containing 3D mesh information.

When the IFSC node 1840 is processed, first, the URL of the IFSC link node has 3D mesh information, and if an empty IndexedFaceSet node which does not contain 3D mesh information comes as the next node to be processed, 3D mesh information can be fetched from an independent stream containing 3D mesh information, by referring to the previous IFSC link node. However, if there is no IFS link node before the IFS node, that is, if the situation is the same as in the IndexedFaceSet node 1800, 3D mesh information is transmitted through an SD stream together with other SD information and processed by the SD codec 1810 as in the normal IndexedFaceSet node processing method.

Figure 19:
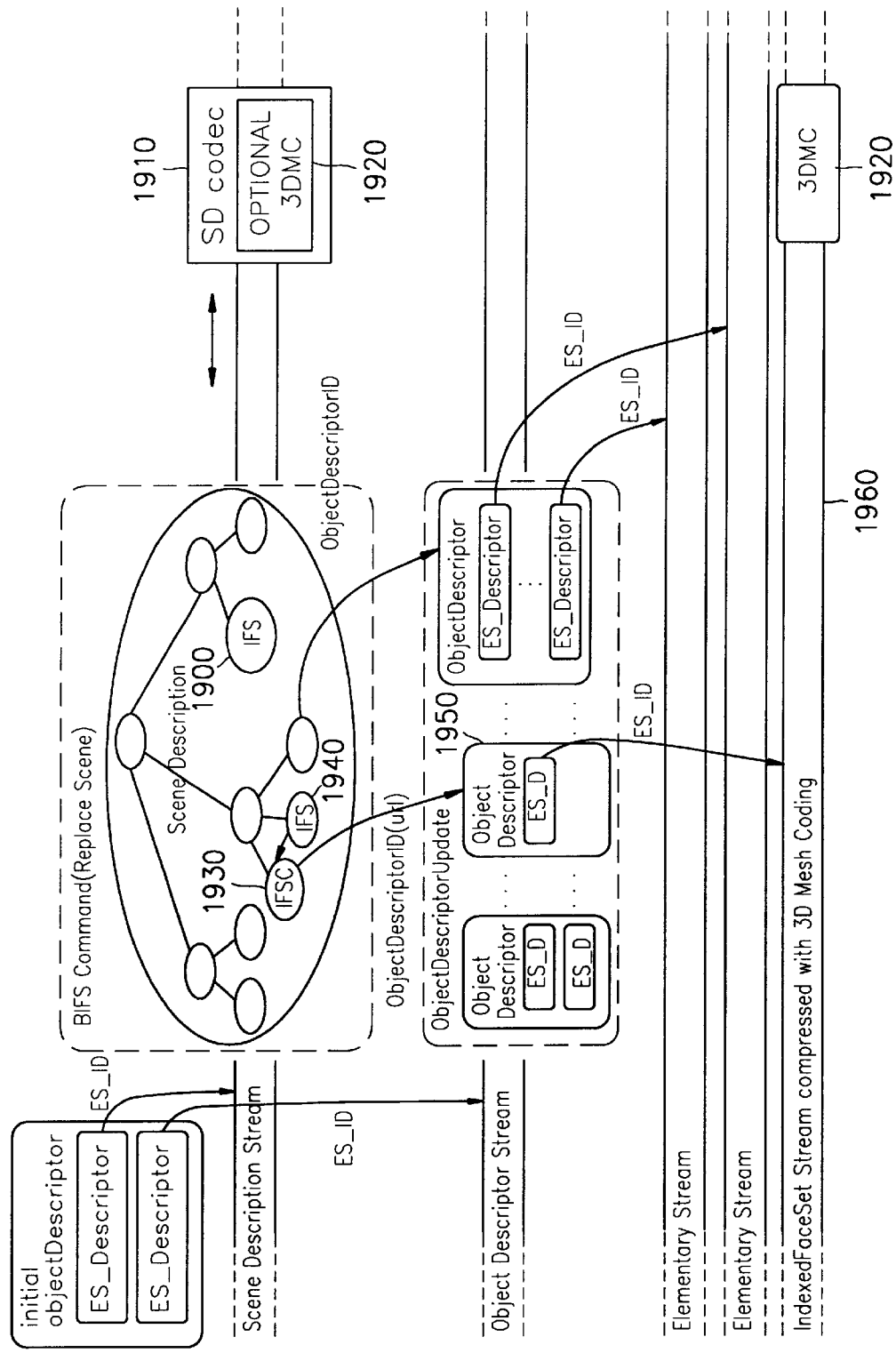
FIG. 19 is a conceptual diagram of a process in which the IndexedFaceSet node of scene description is processed by a seventh embodiment of the present invention.

FIG. 19 is a conceptual diagram of a structure in which according to a seventh embodiment of the present invention, an FISConnect node 1930, which is a link node for linking an IFS node 1940 to an independent stream having 3D mesh information, is defined and used as FIG. 10, an IFS node 1900, which encodes 3D mesh information without using a separate stream, is contained, and a 3DMC 1920 is independently arranged separately from the SD codec 1910, and another 3DMC 1920 is arranged in the SD codec 1910.

The seventh embodiment is different from the sixth embodiment in that in an IFS node 1900 which does not use an IFSC link node, encoded 3D mesh information is transmitted through a scene description stream together with other scene description information to the SD codec 1910, and decoded by the optional 3DMC 1920 arranged in the SD codec 1910, and other processes are the same as those of the sixth embodiment.

Figure 20:
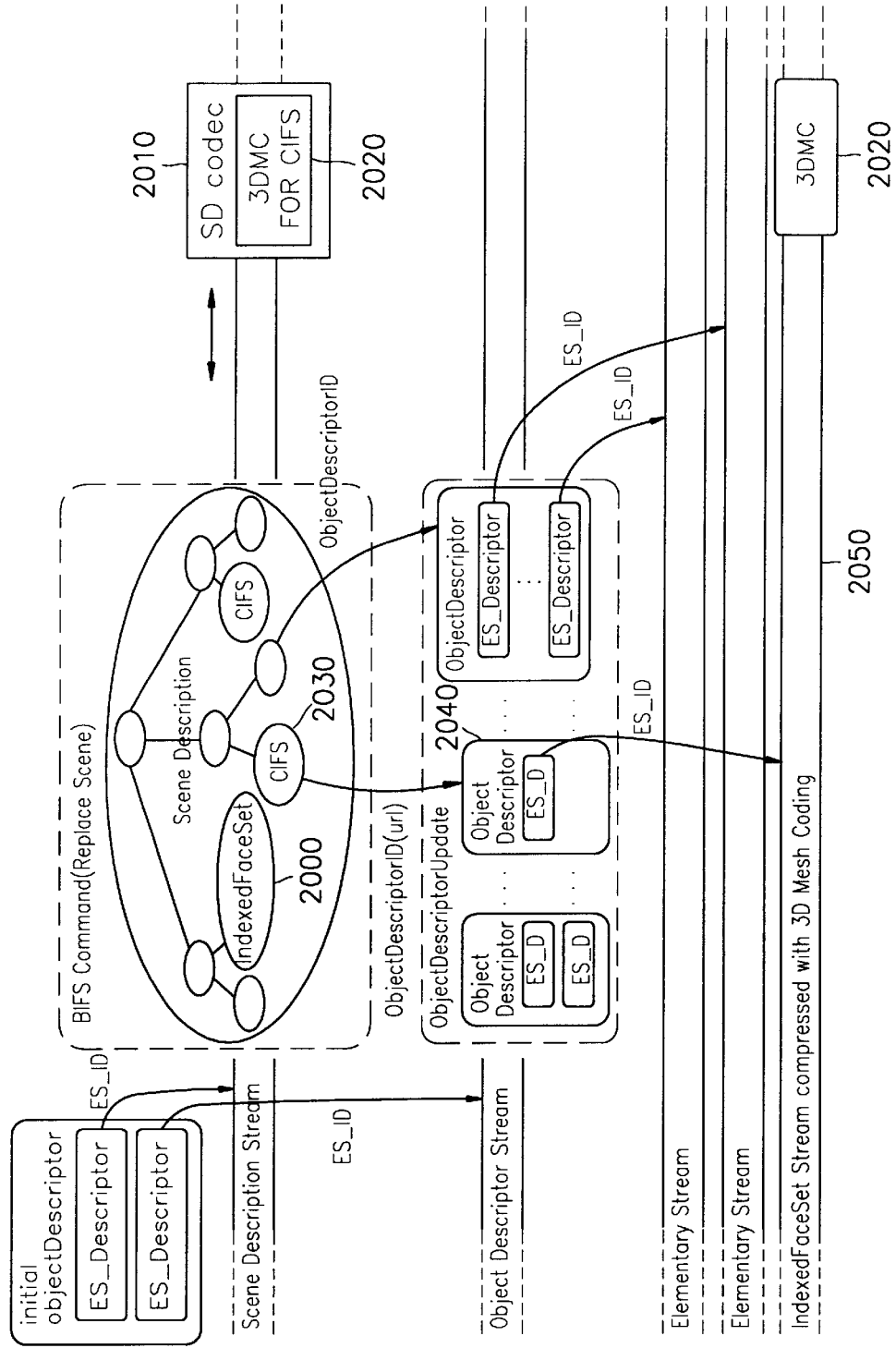
FIG. 20 is a conceptual diagram of a process in which the IndexedFaceSet node of scene description is processed by a eighth embodiment of the present invention.

FIG. 20 is a conceptual diagram of a structure in which according to an eighth embodiment of the present invention, the normal IndexedFaceSet node is not changed, a new compressed node having an interface as shown in FIG. 11 is defined and used, and a 3DMC 2020 is arranged in the SD codec 2010, or independently arranged separately from the SD codec 2010.

The normal IndexedFaceSet node 2000 contains normal IndexedFaceSet fields as shown in FIG. 7, and the newly generated CIFS node 2030 contains the normal IndexedFaceSet node fields 1100 and a URL field 1110 as shown in FIG. 11A.

The IndexedFaceSet node 2000 is processed by the normal node processing method, that is, processing without encoding 3D mesh information. As for the newly generated CIFS node 2030, if the URL field 1110 is used, encoded 3D mesh information is transmitted through an independent stream containing encoded 3D mesh information, to the 3DMC 2020 which is independently arranged separately from the SD codec, and decoded. If the newly generated CIFS node uses the normal IndexedFaceSet node fields 1100, encoded 3D mesh information is transmitted through a scene description stream together with other scene description information, to the SD codec 2010, and decoded by the 3DMC 2020 for CIFS arranged in the SD codec.

In the above explanation of the present invention, the BIFS is mainly explained as a language for representing a 3D scene, but the present invention can be applied to the VRML or Web3D, each of which is a language for representing a 3D scene, which is clear to anyone skilled in the art.

As described above, preferable embodiments are explained in the drawings and specification, and though specific terminologies are used here, those were only to explain the present invention. Therefore, the present invention is not restricted to the above-described embodiments and many variations are possible within the spirit and scope of the present invention. The scope of the present invention is not determined by the description but by the accompanying claims.

As described above, according to the present invention, 3D scene description can be more efficiently transmitted and stored by encoding and decoding a node representing 3D mesh information among nodes contained in a 3D scene, using a 3D mesh encoder and decoder.

Also, according to the present invention, by transmitting and storing 3D mesh information of a node representing encoded 3D mesh information, through an independent stream separate from 3D scene description stream, the entire 3D scene cannot be affected even though encoded 3D mesh information has a huge volume.

What is claimed is:

1. A method for processing nodes contained in a 3-dimensional (3D) scene, the method comprising the steps of:

identifying a 3D mesh node having 3D mesh information representing a 3D shape which is formed by constructing faces from vertices among nodes contained in the 3D scene to be processed; and encoding or decoding the identified 3D mesh node.

2. The method of claim 1, wherein the step for identifying a 3D mesh node includes a step for identifying a 3D mesh node in which a 3D mesh coding identifier is set, and in the step for encoding or decoding the identified 3D mesh node, the 3D mesh node, in which a 3D mesh coding identifier is set, is encoded or decoded.

3. The method of any one of claim 1, further comprising a step of:

transmitting or storing the 3D mesh information of the encoded 3D mesh node through a 3D scene description stream.

4. The method of claim 3, further comprising a step of:

arranging a 3D mesh encoder/decoder within a 3D scene description encoder/decoder so that the 3D mesh information of the encoded 3D mesh node, which is transmitted through the 3D scene description stream, is encoded or decoded.

5. The method of any one of claim 1, further comprising a step of:

transmitting or storing the 3D mesh information of the encoded 3D mesh node through an independent stream separate from the 3D scene description stream.

6. The method of claim 5, further comprising a step of:

arranging an independent 3D mesh encoder/decoder separate from the 3D scene description encoder/decoder so that the 3D mesh information of the encoded 3D mesh node, which is transmitted through the independent stream separate from the 3D scene description stream, is encoded or decoded.

7. The method of any one of claims 1, further comprising the steps of:

transmitting or storing 3D mesh information of some 3D mesh nodes among the encoded 3D mesh nodes through a 3D scene description stream; and transmitting or storing 3D mesh information of some 3D mesh nodes among the encoded 3D mesh nodes through an independent stream separate from the 3D scene description stream.

8. The method of claim 7, further comprising the steps of:

arranging a 3D mesh encoder/decoder within a scene description encoder/decoder so that the 3D mesh information of some 3D mesh nodes among the encoded 3D mesh nodes, which is transmitted through the 3D scene description stream, is encoded or decoded; and arranging another 3D mesh encoder/decoder separate from the scene description encoder/decoder so that the 3D mesh information of some mesh nodes among the encoded 3D mesh nodes, which is transmitted through the independent stream separate from the 3D scene description stream, is encoded or decoded.

9. The method of claim 5, wherein the 3D mesh node contains Uniform Resource Locator (URL) of the independent stream through which the 3D mesh information of the encoded 3D mesh node is transmitted, and the step for encoding or decoding the 3D mesh node includes a step for encoding or decoding the 3D mesh node referring to the URL contained in the 3D mesh node.

10. The method of claim 6, wherein the 3D mesh node contains the URL of the independent stream through which the 3D mesh information of the encoded 3D mesh node is transmitted, and the step for encoding or decoding the 3D mesh node includes a step for encoding or decoding the 3D mesh node referring to the URL contained in the 3D mesh node.

11. The method of claim 7, wherein the 3D mesh node contains the URL of the independent stream through which the 3D mesh information of the encoded 3D mesh node is transmitted, and the step for encoding or decoding the 3D mesh node includes a step for encoding or decoding the 3D mesh node referring to the URL contained in the 3D mesh node.

12. The method of claim 8, wherein the 3D mesh node contains the URL of the independent stream through which the 3D mesh information of the encoded 3D mesh node is transmitted, and the step for encoding or decoding the 3D mesh node includes a step for encoding or decoding the 3D mesh node referring to the URL contained in the 3D mesh node.

13. The method of claim 5, further comprising a step of:

generating a link node containing URL of the independent stream through which the 3D mesh information of the encoded 3D mesh node is transmitted, wherein the step for encoding or decoding the 3D mesh node includes a step for encoding or decoding the 3D mesh node referring to the URL contained in the link node.

14. The method of claim 6, further comprising a step of:

generating a link node containing the URL of the independent stream through which the 3D mesh information of the encoded 3D mesh node is transmitted, Wherein the step for encoding or decoding the 3D mesh node includes a step for encoding or decoding the 3D mesh node referring to the URL contained in the link node.

15. The method of claim 7, further comprising a step of:

generating a link node containing the URL of the independent stream through which the 3D mesh information of the encoded 3D mesh node is transmitted, wherein the step for encoding or decoding the 3D mesh node includes a step for encoding or decoding the 3D mesh node referring to the URL contained in the link node.

16. The method of claim 8, further comprising a step of:

generating a link node containing the URL of the independent stream through which the 3D mesh information of the encoded 3D mesh node is transmitted, wherein the step for encoding or decoding the 3D mesh node includes a step for encoding or decoding the 3D mesh node referring to the URL contained in the link node.

17. A method for processing nodes contained in a 3D scene, the method comprising the steps of:

generating a compression 3D mesh node for compressing a 3D mesh node having 3D mesh information representing a 3D shape, which is formed by constructing faces from vertices among nodes contained in the 3D scene;

identifying the compression 3D mesh node among nodes contained in the 3D scene to be processed; and encoding or decoding the identified compression 3D mesh node using a 3D mesh encoder/decoder.

18. The method of any one of claim 1, wherein a platform for implementing the 3D scene includes Virtual Reality Modeling Language (VRML), Binary Format for Scene (BIFS), and Web3D.

19. The method of any one of claim 1, wherein the 3D mesh node includes an IndexedFaceSet node.

20. An apparatus for processing nodes contained in a 3D scene, the apparatus comprising:

a controller for identifying a 3D mesh node having 3D mesh information representing a 3D shape, which is formed by constructing faces from vertices, among nodes in the 3D scene to be processed;

a 3D mesh encoder/decoder for encoding or decoding the 3D mesh node identified by the controller; and a 3D scene description encoder/decoder for encoding or decoding the identified 3D mesh node.

21. The apparatus of claim 20, wherein the controller further identifies the 3D mesh node in which a 3D mesh coding identifier is set, and the 3D mesh encoder/decoder encodes or decodes the 3D mesh node, in which the 3D mesh coding identifier is set, among the 3D mesh nodes identified by the controller.

22. The apparatus of claim 20, wherein the controller transmits or stores the 3D mesh information of the encoded 3D mesh node through a 3D scene description stream; and the 3D mesh encoder/decoder is arranged in the 3D scene description encoder/decoder.

23. The apparatus of claim 20, wherein the controller transmits or stores the 3D mesh information of the encoded 3D mesh node through an independent stream separate from the 3D scene description stream; and the 3D mesh encoder/decoder is independently arranged separate from the 3D scene encoder/decoder.

24. The apparatus of claim 20, wherein the controller transmits and stores the 3D mesh information of some 3D mesh nodes among the encoded 3D mesh nodes through the 3D scene description stream, and transmits or stores the 3D mesh information of some 3D mesh nodes among the encoded 3D mesh nodes through an independent stream separate from the scene description stream, and the 3D mesh encoder/decoder is arranged in the 3D scene description encoder/decoder, and another 3D mesh encoder/decoder is independently arranged separate from the 3D scene description encoder/decoder.

25. The apparatus of claim 24, wherein the 3D mesh information of the 3D mesh node, which is transmitted through the 3D scene description stream, is encoded or decoded by the 3D mesh encoder/decoder arranged in the 3D scene description encoder/decoder, and the 3D mesh information of the 3D mesh node, which is transmitted through the independent stream separate from the 3D scene description stream, is encoded or decoded by the independently arranged 3D mesh encoder/decoder.

26. The apparatus of claim 23, wherein the 3D mesh node contains URL of an independent stream through which the 3D mesh information of the encoded 3D mesh node is transmitted, so that the 3D mesh information of the encoded 3D mesh node is transmitted through the independent stream, and the 3D mesh encoder/decoder encodes or decodes the 3D mesh node referring to the URL contained in the 3D mesh node.

27. The apparatus of claim 24, wherein the 3D mesh node contains URL of an independent stream through which the 3D mesh information of the encoded 3D mesh node is transmitted, so that the 3D mesh information of the encoded 3D mesh node is transmitted through the independent stream, and the 3D mesh encoder/decoder encodes or decodes the 3D mesh node referring to the URL contained in the 3D mesh node.

28. The apparatus of claim 23, wherein the controller generates a link node containing URL of an independent stream through which the 3D mesh information of the encoded 3D mesh node is transmitted, so that the 3D mesh information of the encoded 3D mesh node is transmitted through the independent stream, and the 3D mesh encoder/decoder encodes or decodes the 3D mesh node referring to the URL contained in the link node.

29. The apparatus of claim 24, wherein the controller generates a link node containing URL of an independent stream through which the 3D mesh information of the encoded 3D mesh node is transmitted, so that the 3D mesh information of the encoded 3D mesh node is transmitted through the independent stream, and the 3D mesh encoder/decoder encodes or decodes the 3D mesh node referring to the URL contained in the link node.

30. An apparatus for processing nodes contained in a 3D scene, the apparatus comprising:

a controller for generating a compression 3D mesh node for compressing a 3D mesh node having 3D mesh information representing a 3D shape which is formed by constructing faces from vertices among nodes in the 3D scene and identifying the compression 3D mesh node among nodes contained in the 3D scene to be processed;

a 3D mesh encoder/decoder for encoding or decoding the identified compression 3D mesh node; and a 3D scene encoder/decoder for encoding or decoding the nodes contained in the 3D scene excluding the compression 3D mesh nodes.

31. The apparatus of any one of claim 20, wherein a platform for implementing the 3D scene includes Virtual Reality Modeling Language (VRML), Binary Format for Scene (BIFS), and Web3D.

32. The apparatus of any one of claim 20, wherein the 3D mesh node includes an IndexedFaceSet node.

33. The method of claim 2, further comprising a step of:
transmitting or storing the 3D mesh information of the encoded 3D mesh node through a 3D scene description stream.

34. The method of claim 2, further comprising a step of:
transmitting or storing the 3D mesh information of the encoded 3D mesh node through an independent stream separate from the 3D scene description stream.

35. The method of claim 2, further comprising the steps of:

transmitting or storing 3D mesh information of some 3D mesh nodes among the encoded 3D mesh nodes through a 3D scene description stream;

transmitting or storing 3D mesh information of some 3D mesh nodes among the encoded 3D mesh nodes through an independent stream separate from the 3D scene description stream.

36. The method of claim 2, wherein a platform for implementing the 3D scene includes Virtual Reality Modeling Language (VRML), Binary Format for Scene (BIFS), and Web3D.

37. The method of claim 17, wherein a platform for implementing the 3D scene includes Virtual Reality Modeling Language (VRML), Binary Format for Scene (BIFS), and Web3D.

38. The method of claims 2, wherein the 3D mesh node includes an IndexedFaceSet node.

39. The method of claim 17, wherein the 3D mesh node includes an IndexedFaceSet node.

40. The apparatus of claim 21, wherein the controller transmits or stores the 3D mesh information of the encoded 3D mesh node through a 3D scene description stream; and the 3D mesh encoder/decoder is arranged in the 3D scene description encoder/decoder.

41. The apparatus of claim 21, wherein the controller transmits or stores the 3D mesh information of the encoded 3D mesh node through an independent stream separate from the 3D scene description stream; and the 3D mesh encoder/decoder is independently arranged separate from the 3D scene encoder/decoder.

42. The apparatus of claim 21, wherein the controller transmits and stores the 3D mesh information of some 3D mesh nodes among the encoded 3D mesh nodes through the 3D scene description stream, and transmits or stores the 3D mesh information of some 3D mesh nodes among the encoded 3D mesh nodes through an independent stream separate from the scene description stream, and the 3D mesh encoder/decoder is arranged in the 3D scene description encoder/decoder, and another 3D mesh encoder/decoder is independently arranged separate from the 3D scene description encoder/decoder.

43. The apparatus of claim 21, wherein a platform for implementing the 3D scene includes Virtual Reality Modeling Language (VRML), Binary Format for Scene (BIFS), and Web3D.

44. The apparatus of claim 30, wherein a platform for implementing the 3D scene includes Virtual Reality Modeling Language (VRML), Binary Format for Scene (BIFS), and Web3D.

45. The apparatus of claim 21, wherein the 3D mesh node includes an IndexedFaceSet node.

46. The apparatus of claim 30, wherein the 3D mesh node includes an IndexedFaceSet node.

* * * * *